United States Patent [19]

Taniguchi et al.

[11] Patent Number: 5,682,672
[45] Date of Patent: Nov. 4, 1997

[54] CABLE ARRANGEMENT INDICATING AND INSPECTING APPARATUS FOR CONNECTOR

[75] Inventors: Yoshikazu Taniguchi; Katsutoshi Kato; Kouji Murata, all of Yokkaichi, Japan

[73] Assignee: Sumitomo Wiring Systems, Ltd., Japan

[21] Appl. No.: 608,630

[22] Filed: Feb. 29, 1996

[30] Foreign Application Priority Data

Mar. 23, 1995 [JP] Japan .................................. 7-064237

[51] Int. Cl.⁶ .......................... H01R 43/20; B23Q 15/00
[52] U.S. Cl. ............................ 29/748; 29/407; 29/705; 29/721
[58] Field of Search ........................ 29/33 M, 407, 29/703, 705, 720, 721, 747, 748, 833, 845, 593; 324/555, 556; 356/73.1; 340/326, 332

[56] References Cited

U.S. PATENT DOCUMENTS

| | | | |
|---|---|---|---|
| 3,706,134 | 12/1972 | Sweeney et al. | 29/407 X |
| 3,722,061 | 3/1973 | Bowles | 29/721 X |
| 3,913,202 | 10/1975 | Pyle et al. | 29/721 |
| 4,318,222 | 3/1982 | Fröhlich | 29/721 |
| 4,727,637 | 3/1988 | Buckwitz et al. | 29/833 X |
| 5,198,983 | 3/1993 | Blake et al. | 29/747 X |
| 5,477,606 | 12/1995 | Igura | 29/748 X |
| 5,590,457 | 1/1997 | Ninchi | 29/747 X |

FOREIGN PATENT DOCUMENTS

| | | |
|---|---|---|
| 242876 | 11/1987 | European Pat. Off. . |
| 389312 | 9/1990 | European Pat. Off. . |
| 565080 | 10/1993 | European Pat. Off. . |
| 2598858 | 11/1987 | France .................................. 29/748 |
| 135481 | 11/1978 | Japan .................................. 29/721 |

OTHER PUBLICATIONS

Abstract of Japanese Patent Application Laid–Open No. 5-47448 (1993).

*Primary Examiner*—Peter Vo
*Attorney, Agent, or Firm*—Jordan B. Bierman; Bierman, Muserlian and Lucas LLP

[57] ABSTRACT

A cable arrangement indicating and inspecting apparatus for a connector is disclosed. Cables are removed from cable receiving portions (1) in accordance with indicator LEDs (2) caused to blink by a first driving portion (23), and light from illuminative LEDs (28) turned on by a second driving portion (35) is directed through light emitting optical fibers (29) and detecting optical fibers (14) into receiving holes of a connector to directly illuminate the interior of select receiving holes into which terminals are to be inserted. When the terminals are inserted into the select receiving holes, the light reflected from the terminals is directed through the detecting optical fibers (14) and light receiving optical fibers (31) onto light receiving portions (30), and proper terminal insertion is detected on the basis of a light reception signal from the light receiving portions (30). The apparatus eliminates the conventional need to check the receiving holes of the connector against the indicated position to insert the terminals, and allows the detection of terminal insertion by using the light reflected from the terminals, performing the terminal insertion and inspection of terminals for proper insertion simultaneously and achieving improvement in operating efficiency.

4 Claims, 7 Drawing Sheets

CABLE ARRANGEMENT INDICATING AND INSPECTING APPARATUS FOR CONNECTOR

BACKGROUND OF THE INVENTION

1. Field of the Invention

The present invention relates to a cable arrangement indicating and inspecting apparatus for connectors which indicates, among all receiving holes of a connector, at least one select receiving hole into which a terminal mounted at a cable end is to be inserted, and which inspects the terminal for proper insertion in the select receiving hole.

2. Description of the Background Art

A conventional apparatus for indicating, among all receiving holes of a connector, select receiving holes into which a terminal mounted at a cable end is to be inserted and for inspecting the terminals for proper insertion in the select receiving holes is disclosed in, for example, Japanese Patent Application Laid-Open No. 5-47448 (1993). This apparatus comprises a plurality of switches having electrode pins and provided in corresponding relation to a plurality of terminal receiving chambers of a connector housing, a plurality of indicator lamps arranged in corresponding relation to the arrangement of the electrode pins, and an indicator lamp operating circuit provided between the switches and the indicator lamps. A metal terminal member previously connected to a cable is inserted into each terminal receiving chamber to move the associated electrode pin to actuate the associated switch, thereby lighting the associated indicator lamp.

In the above described apparatus, however, means other than and exterior to the connector (an indicator circuit, and the indicator lamps) indirectly indicate the connecting positions of the terminals. An operator is required to check the terminal connecting position of the connector against the position indicated by the indicator means to insert the terminal into the connector, resulting in poor workability and the likelihood of insertion of the terminal in an incorrect position.

SUMMARY OF THE INVENTION

A first aspect of the present invention is intended for a cable arrangement indicating and inspecting apparatus for a connector, the apparatus for indicating, among all receiving holes of a connector which are predetermined in number, at least one select receiving hole into which a terminal mounted at an end of a cable is to be inserted and for inspecting the terminal for proper insertion in the at least one select receiving hole. According to the present invention, the apparatus comprises: cable receiving portions corresponding respectively to all of the receiving holes of the connector for receiving cables having different product numbers; a product number setting portion operated to input the product numbers of the cables received in required ones of the cable receiving portions; a storage portion operated by the product number setting portion for previously storing the inputted product numbers therein; removal indicating light emitting means provided adjacent the cable receiving portions, respectively; light emitting portions corresponding respectively to all of the receiving holes of the connector; light emitting optical fibers having end surfaces opposed respectively to the light emitting portions for introducing light from the light emitting portions into the receiving holes to illuminate and indicate the at least one select receiving hole; light receiving optical fibers corresponding respectively to the light emitting optical fibers for receiving light reflected from the terminal inserted in the at least one select receiving hole indicated by illumination through the light emitting optical fibers; light receiving portions opposed respectively to end surfaces of the light receiving optical fibers for receiving the reflected light through the light receiving optical fibers to output a light reception signal; a first driving portion for sequentially blinking the removal indicating light emitting means adjacent the cable receiving portions receiving the cables having the product numbers stored in the storage portion when the terminal at the end of the cable is inserted; a second driving portion for sequentially lighting some of the light emitting portions which are associated with the product numbers stored in the storage portion when the terminal at the cable end is inserted; and a judging portion for comparing the product number of the cable associated with the blinking removal indicating light emitting means in response to the light reception signal with the product numbers of the cables corresponding to the light emitting portions opposed to the light emitting optical fibers, the judging portion determining proper insertion of the terminal in the at least one select receiving hole when the compared product numbers match.

In the first aspect of the present invention, the first driving portion causes the removal indicating light emitting means to blink to indicate the cable receiving portion from which the cable is to be removed, and light from the light emitting portion turned on by the second driving portion is introduced into the receiving hole of the connector to illuminate the interior of the receiving hole. This facilitates the recognition of the select receiving hole into which the terminal at the end of the removed cable is to be inserted, and eliminates the conventional need for the operator to check the receiving holes of the connector against the indicated position, achieving improvements in operating efficiency over the background art apparatus.

When the terminal is inserted into the indicated select receiving hole of the connector, the light reflected from the inserted terminal is received by the light receiving portion, and the light reception signal from the light receiving portion is used to inspect the terminal for proper insertion. Thus, the insertion of the terminal and the inspection of the terminal for proper insertion are performed simultaneously, further improving the operating efficiency.

Preferably, according to a second aspect of the present invention, the cable arrangement indicating and inspecting apparatus further comprises: photocouplers for coupling the light emitting optical fibers and the light receiving optical fibers, respectively; and detecting optical fibers drawn respectively from the photocouplers and having ends inserted into the receiving holes of the connector, respectively, the detecting optical fibers introducing light from the light emitting portions into the receiving holes and receiving the reflected light from the terminals in the receiving holes to transmit the reflected light to the light receiving optical fibers.

In the second aspect of the present invention, the photocouplers couple the light emitting optical fibers and the light receiving optical fibers, respectively. The ends of the detecting optical fibers drawn from the respective photocouplers are inserted into the receiving holes of the connector, respectively. Each of the receiving holes of the connector receives only one detecting optical fiber. This prevents larger space for fiber insertion. The present invention is applicable to a connector having small receiving holes.

Preferably, according to a third aspect of the present invention, the cable arrangement indicating and inspecting apparatus further comprises: an acceptance indicating portion for indicating that the connector is acceptable when the judging portion determines that the terminal is inserted in the at least one select receiving hole of the connector.

In the third aspect of the present invention, the acceptance indicating portion indicates that the connector is acceptable when the judging portion determines that the terminal is inserted in the select receiving hole. This facilitates the determination as to whether the connector is acceptable or defective.

It is therefore an object of the present invention to provide an apparatus for directly indicating at least one select receiving hole of a connector into which a terminal at a cable end is to be inserted and for inspecting the terminal for proper insertion in the select receiving hole.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
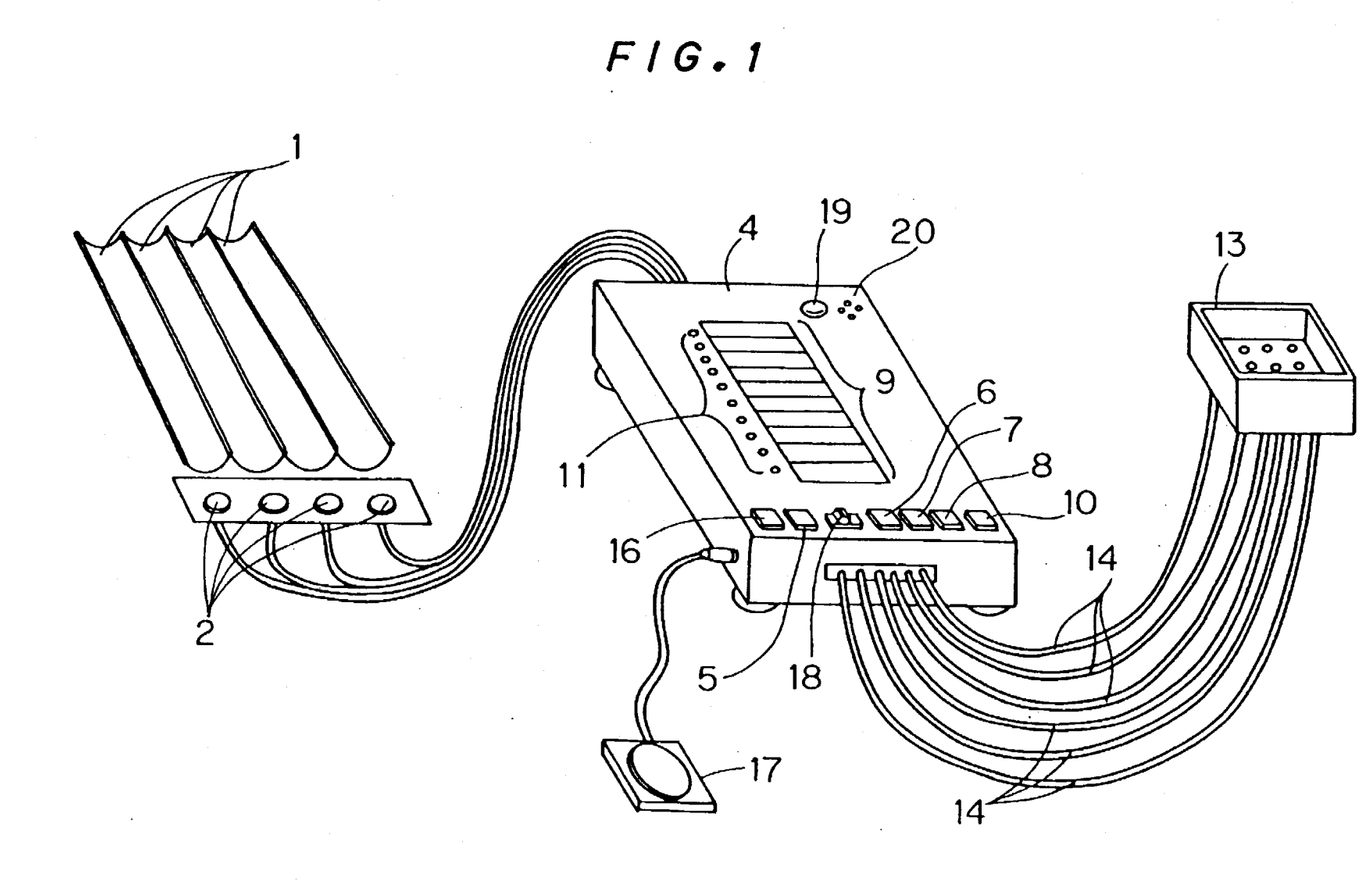
FIG. 1 is a schematic outside view of a preferred embodiment according to the present invention.
Figure 2:
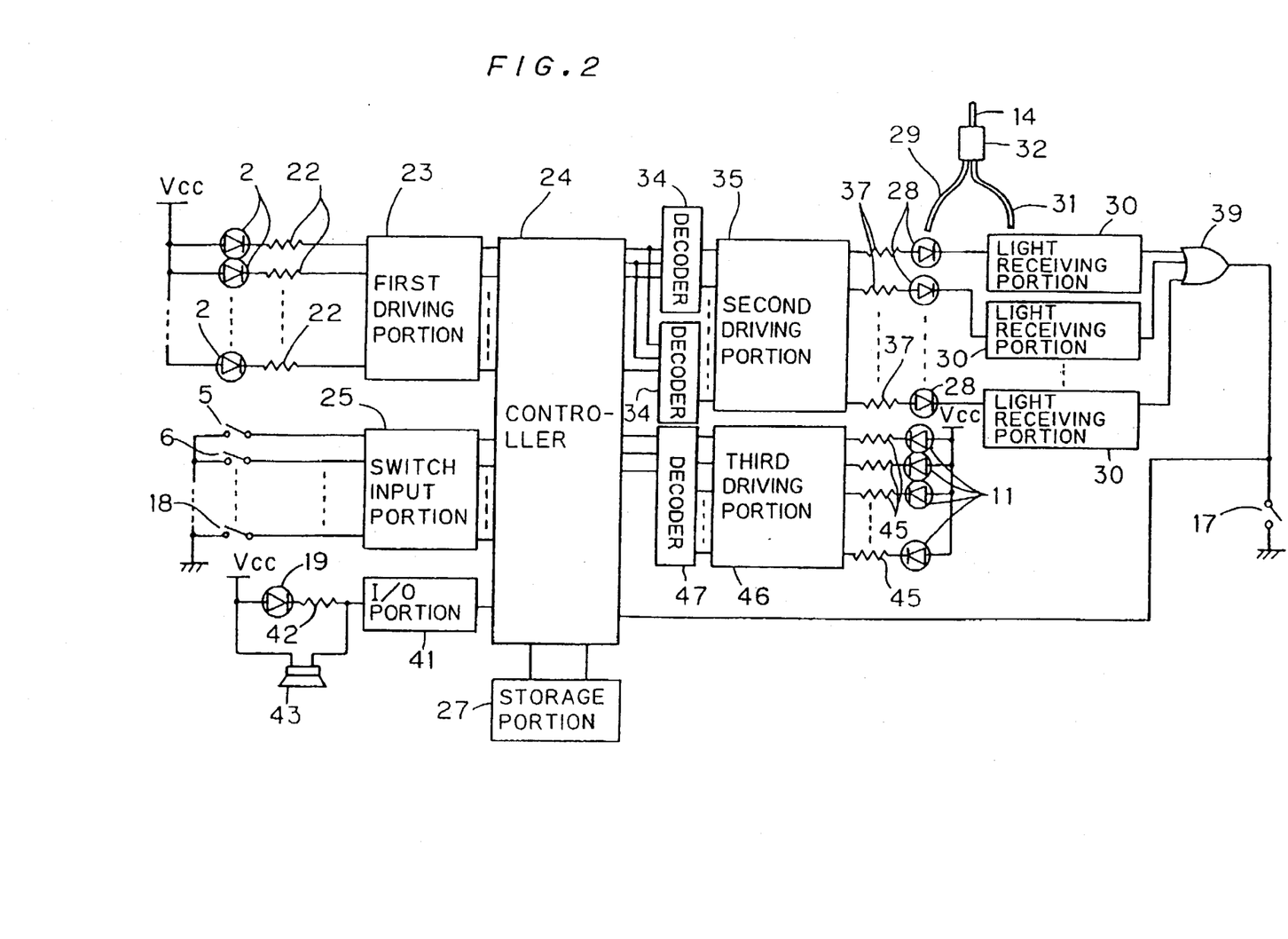
FIG. 2 is a detail diagram of the preferred embodiment according to the present invention.

FIG. 1 is a schematic outside view of a preferred embodiment according to the present invention. FIG. 2 is a detail diagram of the preferred embodiment. FIGS. 3 through 7 are flow charts illustrating the operation of the preferred embodiment.

An apparatus according to the present invention will now be described with reference to the outside view of FIG. 1.

Referring to FIG. 1, a predetermined number of hollow semicylindrical cable receiving portions 1 are provided in corresponding relation to all receiving holes, which are predetermined in number, of a connector for receiving terminals. Although not shown, each of the cable receiving portions 1 receives a cable having a terminal mounted at its end. Indicator LEDs 2 serving as removal indicating light emitting means are located respectively adjacent the cable receiving portions 1 and driven by a first driving portion to be described later to blink and light up.

A unit case 4 includes a product number selection switch 5 serving as a product number setting portion and actuated to input the product numbers of the cables received in required ones of the cable receiving portions 1, an indicator LED selection switch 6, an optical fiber selection switch 7, and a memory switch 8. Continuously depressing the product number selecting switch 5 for two seconds or more alternatively switches the apparatus between a storage mode and a work mode. Actuation of the product number selection switch 5 in the storage mode selects one of all predetermined product numbers displayed on a plurality of product number display portions 9 of the unit case 4, and actuation of the indicator LED selection switch 6 sets the indicator LED 2 corresponding to the cable receiving portion 1 which receives the cable having the selected product number. Actuation of the optical fiber selection switch 7 sets an illuminative LED 28 to be described later corresponding to a select receiving hole which is to receive the terminal at the end of the cable having the selected product number. The selected product number is stored in a storage portion to be described later by actuation of the memory switch 8.

When the cable having the selected product number is a branch cable, the indicator LED 2 corresponding to the same cable receiving portion 1 is set again, and an illuminative LED 28 to be described later corresponding to another select receiving hole which is to receive the terminal at the end of the branch cable branched from the main cable is set and stored in the storage portion.

An eraser switch 10 actuated to clear the product number stored in the storage portion is provided adjacent the memory switch 8 on the unit case 4. Product number indicator LEDs 11 are provided adjacent the respective product number display portions 9 and adapted such that a product number indicator LED 11 corresponding to the product number display portion 9 which displays the selected product number lights up.

A connector receiving element 13 removably fitted on the connector has through apertures in positions corresponding to the receiving holes of the connector. Ends of a plurality of detecting optical fibers 14 extending from the unit case 4 are inserted into the through apertures of the connector receiving element 13. The interior of the receiving holes of the connector is illuminated through the detecting optical fibers 14 for indication of the select receiving holes which are to receive the terminals at the cable ends.

The detecting optical fibers 14 are coupled to light emitting optical fibers and light receiving optical fibers by photocouplers within the unit case 4, respectively.

In FIG. 1, the reference numeral 16 designates a power switch on the top surface of the unit case 4; 17 designates a proceed switch including a foot switch connected to a side surface of the unit case 4 and actuated both at the start of the operation and to move the next operation if the connector is of an uninspectable configuration; 18 designates a mode change switch on the top surface of the unit case 4 for switching the operating mode between an automatic mode wherein the product numbers are sequentially changed for each proper terminal detection and a manual mode wherein one product number is repeated; 19 designates an acceptance LED on the top surface of the unit case 4 for forming an acceptance indicating portion; and 20 designates several through apertures in the top surface of the unit case 4. An acceptance buzzer for forming the acceptance indicating portion is provided under the through apertures 20 within the unit case 4.

A circuit arrangement of the apparatus is discussed below with reference to FIG. 2.

Referring to FIG. 2, each of the indicator LEDs 2 has an anode connected to a DC power supply $V_{CC}$, and a cathode connected to a first driving portion 23 through a resistor 22. The first driving portion 23 turns on the indicator LEDs 2 corresponding to the cable receiving portions 1 which receive the cables having the selected product numbers as above described under the control of a controller 24. For practical inspection, the indicator LEDs 2 associated with the selected product numbers are caused to sequentially blink in ascending order of addresses at which the product numbers are written in the storage portion. After the normal insertion of the terminal at the end of the cable having one of the selected product number is detected, the next indicator LED 2 is shifted from lighting to blinking.

The respective switches 5 through 8, 10, and 18 except the power switch 16 and proceed switch 17 are grounded at one end and are commonly connected to a switch input portion 25 at the opposite end. The switch input portion 25 provides a switch signal in response to the actuated switch to the controller 24.

A storage portion 27 including an EEPROM or the like for performing read and write operations under the control of the controller 24 stores therein the product numbers selected in the above stated manner in response to the actuation of the memory switch 8.

End surfaces of light emitting optical fibers 29 are opposed respectively to the illuminative LEDs 28 serving as light emitting portions and provided in corresponding relation to all receiving holes of the connector, the number of illuminative LEDs 28 equalling the number of all receiving holes. End surfaces of light receiving optical fibers 31 are opposed respectively to light receiving portions 30 including photo ICs, the number of light receiving portions 30 equalling the number of illuminative LEDs 28. The photocouplers 32 couple the pairs of light emitting optical fibers 29 and light receiving optical fibers 31 to the detecting optical fibers 14, respectively. A drive signal is outputted from a second driving portion 35 through resistors 37 to the illuminative LEDs 28 under the control of the controller 24 through decoders 34 to light up the illuminative LEDs 28. The light from the illuminative LEDs 28 is introduced through the light emitting optical fibers 29 and detecting optical fibers 14 into the receiving holes of the connector to illuminate the receiving holes for indication. The light reflected from the terminals is directed through the detecting optical fibers 14 and light receiving optical fibers 31 onto the light receiving portions 30 which in turn output a light reception signal.

The illuminative LEDs 28 are adapted to light up only one at a time, and the photo ICs of the light receiving portions 30 are light modulation photo ICs which can detect only the light emitted therefrom and the synchronized reflected light. Therefore, the terminal must be inserted into the receiving hole indicated by the illuminative LED 28 which stays on before the reflected light is detected and the cable arrangement is determined as acceptable.

The light reception signal from each light receiving portion 30 is applied to an OR gate 39 which in turn provides an output to the controller 24. Since the output from the OR gate 39 is pulse-modulated by the light modulation photo IC of the light receiving portion 30, only the reflected light synchronized with the illuminative LED 28 is detected. The terminal insertion is not determined as proper without the insertion of the terminal into the indicated receiving hole. A judging portion not shown determines whether or not the terminal is properly inserted into the select receiving hole on the basis of the output from the light receiving portion 30 to detect the terminal insertion.

A resistor 42 and the acceptance LED 19 are connected in series between the DC power supply $V_{CC}$ and an I/O portion 41 to form the acceptance indicating portion. When the judging portion determines that the terminals have been properly inserted into all select receiving holes, the acceptance LED 19 lights up, and an acceptance buzzer 43 in parallel with the in-series connection of the resistor 42 and acceptance LED 19 and forming the acceptance indicating portion is also driven to sound, indicating that the connector is acceptable.

Each of the product number indicator LEDs 11 has an anode connected to the DC power supply $V_{cc}$ and a cathode connected to a third driving portion 46 through a resistor 45. A drive signal is outputted from the third driving portion 46 through the resistors 45 to the product number indicator LEDs 11 under the control of the controller 24 through a decoder 47 to turn on the product number indicator LEDs 11.

A series of process steps of operation will be described with reference to the flow charts of FIGS. 3 through 7.

Figure 3:
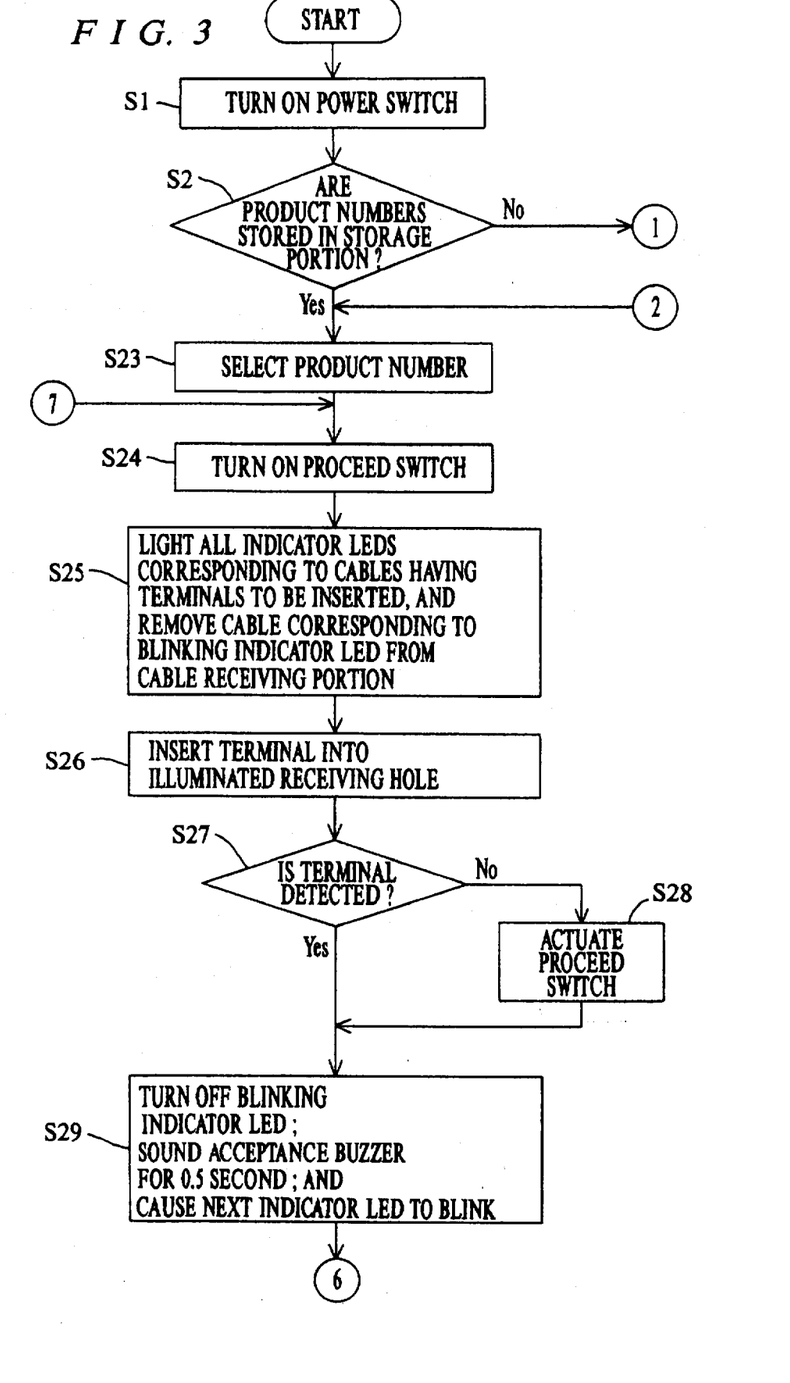
FIGS. 3 through 7 are flow charts illustrating the operation of the preferred embodiment according to the present invention.

Referring to FIG. 3, the power switch 16 is turned on (process step S1), and a determination is made as to whether or not the product numbers are stored in the storage portion 27 (process step S2).

Figure 5:
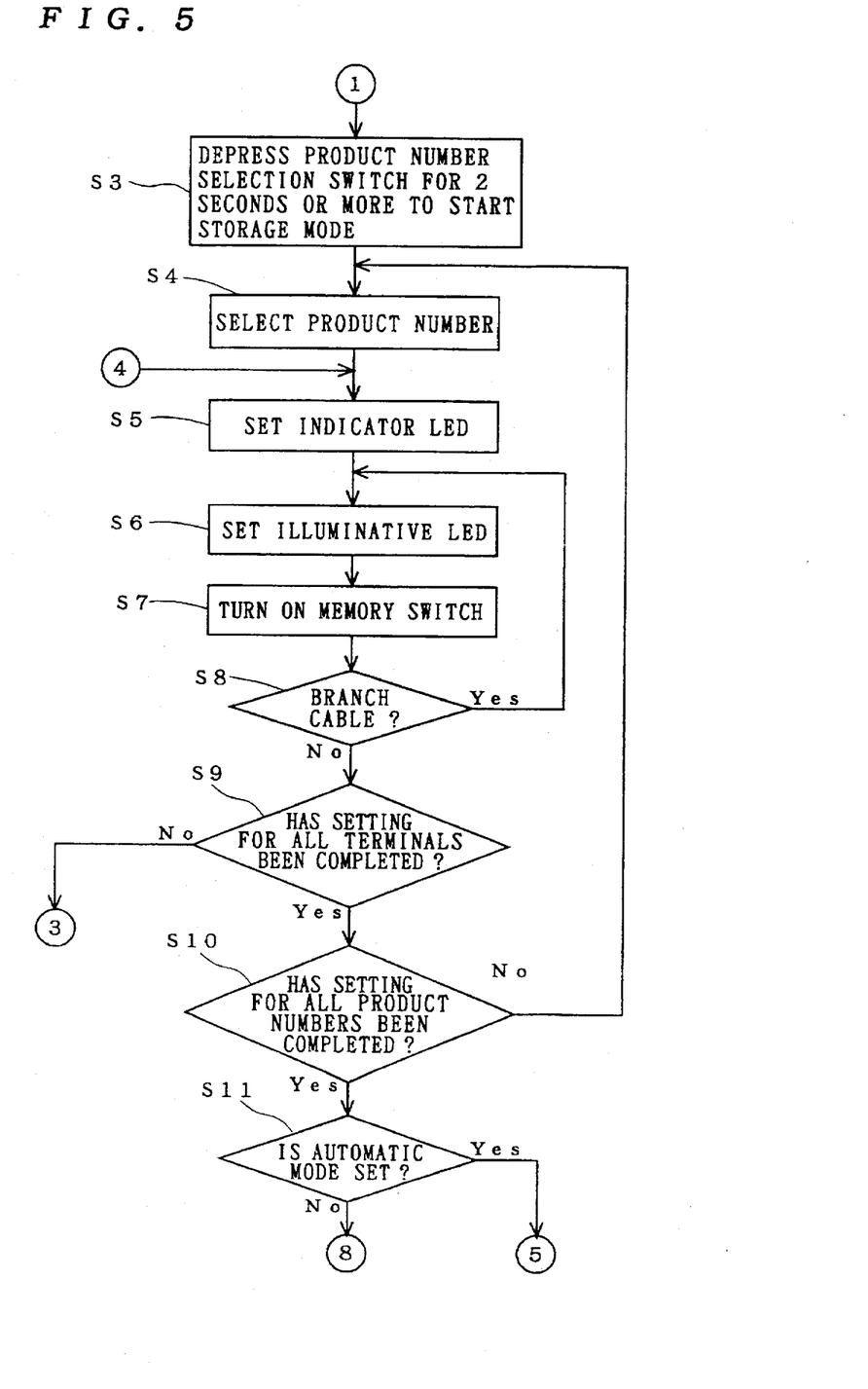

If the result of determination in the process step S2 is NO, the product number selection switch 5 is depressed for two seconds or more to start the storage mode (process step S3). To store the product numbers of the cables in the storage portion 27, the product number selection switch 5 is actuated to select one of the product numbers (process step S4) as shown in FIG. 5, and the indicator LED selection switch 6 is turned on to set the indicator LED 2 corresponding to the cable receiving portion 1 which receives the cable having the selected product number (process step S5). The optical fiber selection switch 7 is turned on to set the illuminative LED 28 corresponding to the select receiving hole into which the terminal at the end of the cable having the selected product number is to be inserted (process step S6). Then, the memory switch 8 is turned on to store the selected product number in the storage portion 27 (process step S7).

A determination is made as to whether the cable having the selected product number is a branch cable or a main cable having opposite ends to be inserted (process step S8). If the cable is the branch cable in the process step S8, the flow returns to the process step S6. If the cable is the main cable in the process step S8, a determination is made as to whether or not the setting for all terminals at the ends of the cables including the branch cable having the selected product number has been completed (process step S9). If the result of determination in the process step S9 is YES, the product number selection switch 5 is actuated to proceed to the next product number, thereby to determine whether or not the setting for all product numbers has been completed (process step S10). If the result of determination in the process step S10 is NO, the flow returns to the process step S4. If the result of determination in the process step S10 is YES, then whether or not the automatic mode is set is determined (process step S11).

Figure 6:
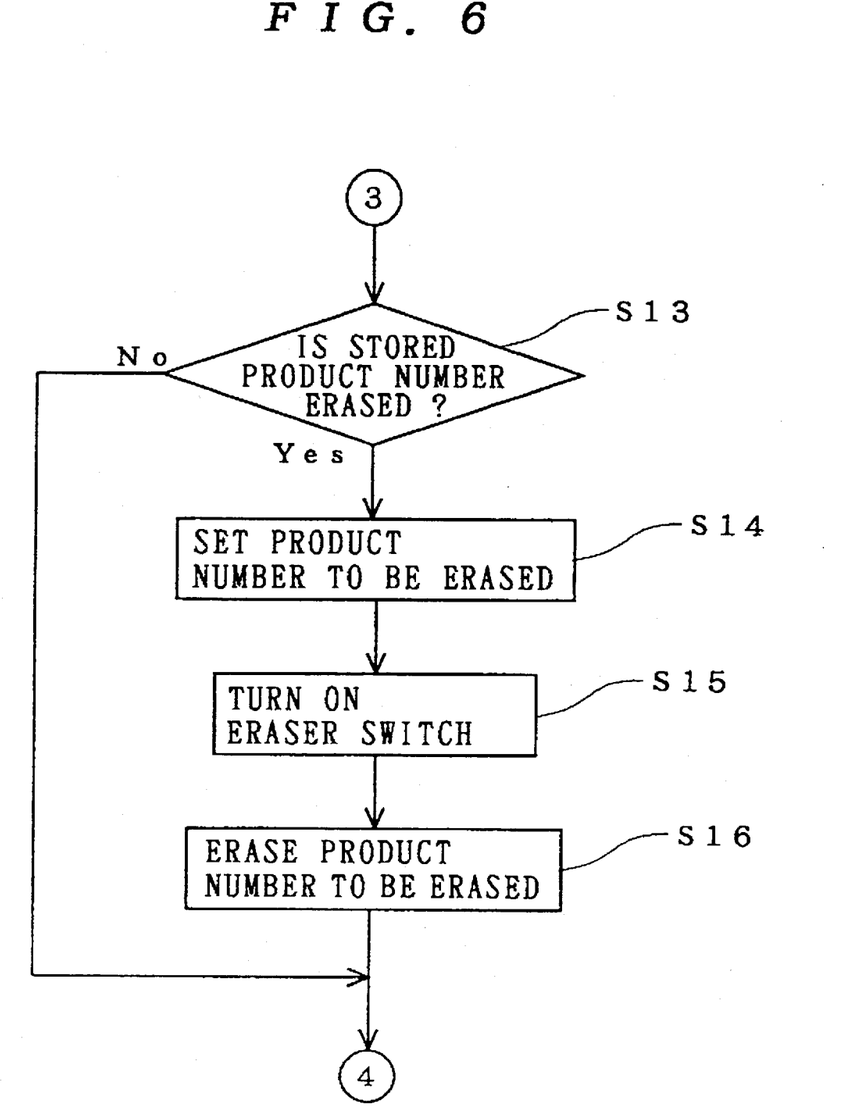

If the result of determination in the process step S9 is NO, the flow proceeds to the process step S13 as shown in FIG. 6, and whether or not the stored product number is erased is determined (process step S13). If the result of determination in the process step S13 is NO, the flow returns to the process step S5. If the result of determination in the process step S13 is YES, the product number to be erased is set (process step S14). The eraser switch 10 is turned on (process step S15), and then the product number to be erased in the storage portion 27 is erased (process step S16). Then the flow returns to the process step S5.

Figure 7:
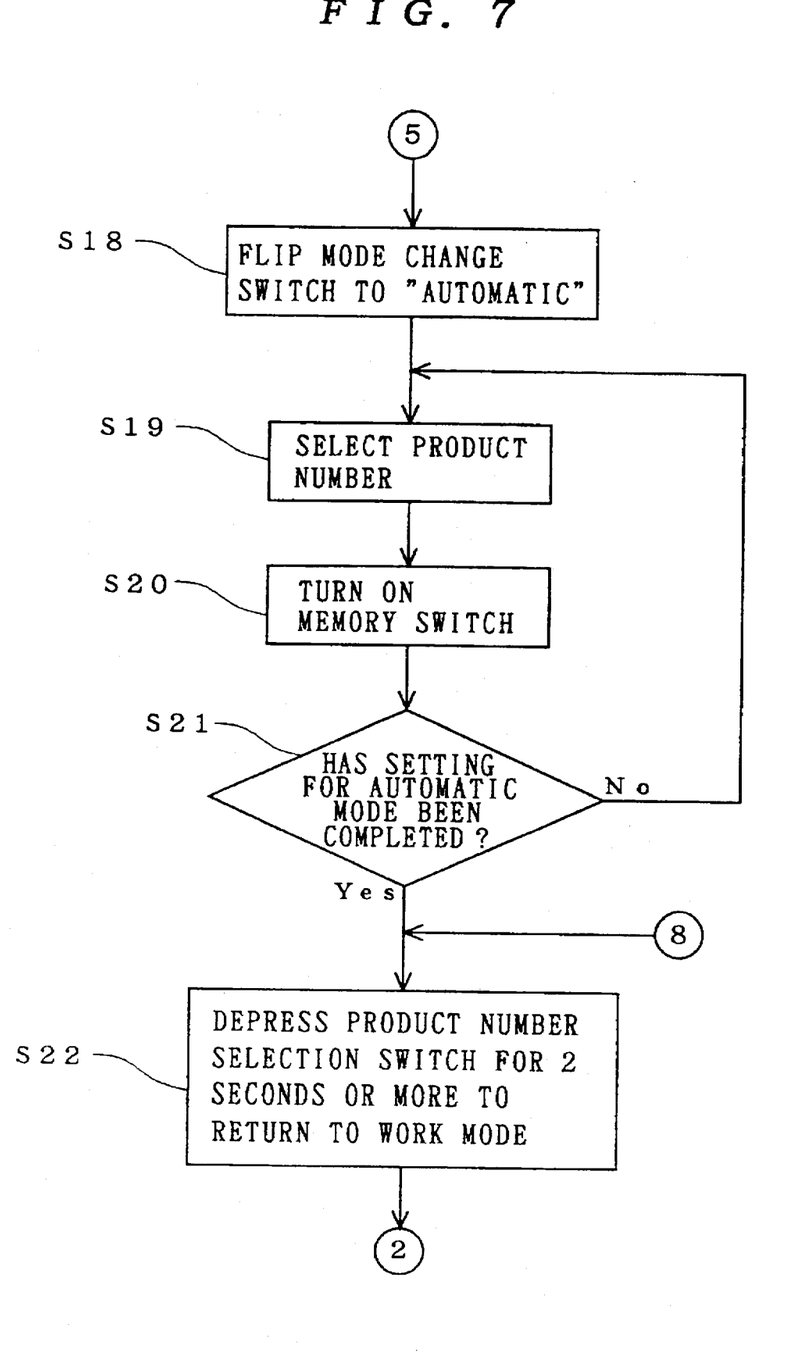

If the result of determination in the process step S11 is YES, the flow proceeds to the process step S18 as shown in FIG. 7, and the mode change switch 18 is flipped to "automatic" (process step S18). Then, the product number stored first in the storage portion 27 is selected by the actuation of the product number selection switch 5 (process step S19). The memory switch 8 is turned on to store the selected product number in the storage portion 27 to be described later (process step S20). The product number selection switch 5 is depressed for two seconds or more to change the apparatus from the storage mode to the work mode, thereby determining whether or not the setting for the automatic mode has been completed (process step S21). If the result of determination in the process step S21 is NO, the flow returns to the process step S19.

If the result of determination in the process step S11 is NO or if the result of determination in the process step S21 is YES, then the product number selection switch 5 is depressed for two seconds or more to change the apparatus from the storage mode to the work mode (process step S22), and the flow proceeds to the process step S23 as shown in FIG. 3. If the result of determination in the process step S2 is YES, the flow also proceeds to the process step S23. The product number selection switch 5 is actuated to select the product number stored first in the storage portion 27 (process step S23). Then, the proceed switch 17 is turned on to place the apparatus into an operation start state (process step S24). The indicator LEDs 2 corresponding to the cables having the terminals to be inserted light up, and the cable having the selected product number is removed from the cable receiving portion 1 corresponding to the indicator LED 2 caused to blink by the first driving portion 23 (process step S25). The terminal at the end of the removed cable is inserted into the receiving hole of the connector which is illuminated by the light from the illuminative LED 28 turned on by the second driving portion 35 (process step S26). A determination is made as to whether or not the terminal insertion is detected on the basis of the light reception signal from the light receiving portion 30 (process step S27). If the result of determination in the process step S27 is NO, the proceed switch 17 is actuated (process step S28) and the flow proceeds to the process step S29. If the result of determination in the process step S27 is YES, the flow directly proceeds to the process step S29. For insertion of the terminal of the next cable, the indicator LED 2 caused to blink by the first driving portion 23 is turned off, and the acceptance buzzer 43 is driven to sound for about 0.5 second to indicate the correct insertion of the current terminal, and then the indicator LED 2 corresponding to the cable receiving portion 1 receiving the cable having the terminal to be inserted next is changed from lighting to blinking by the first driving portion 23 (process step S29).

Figure 4:
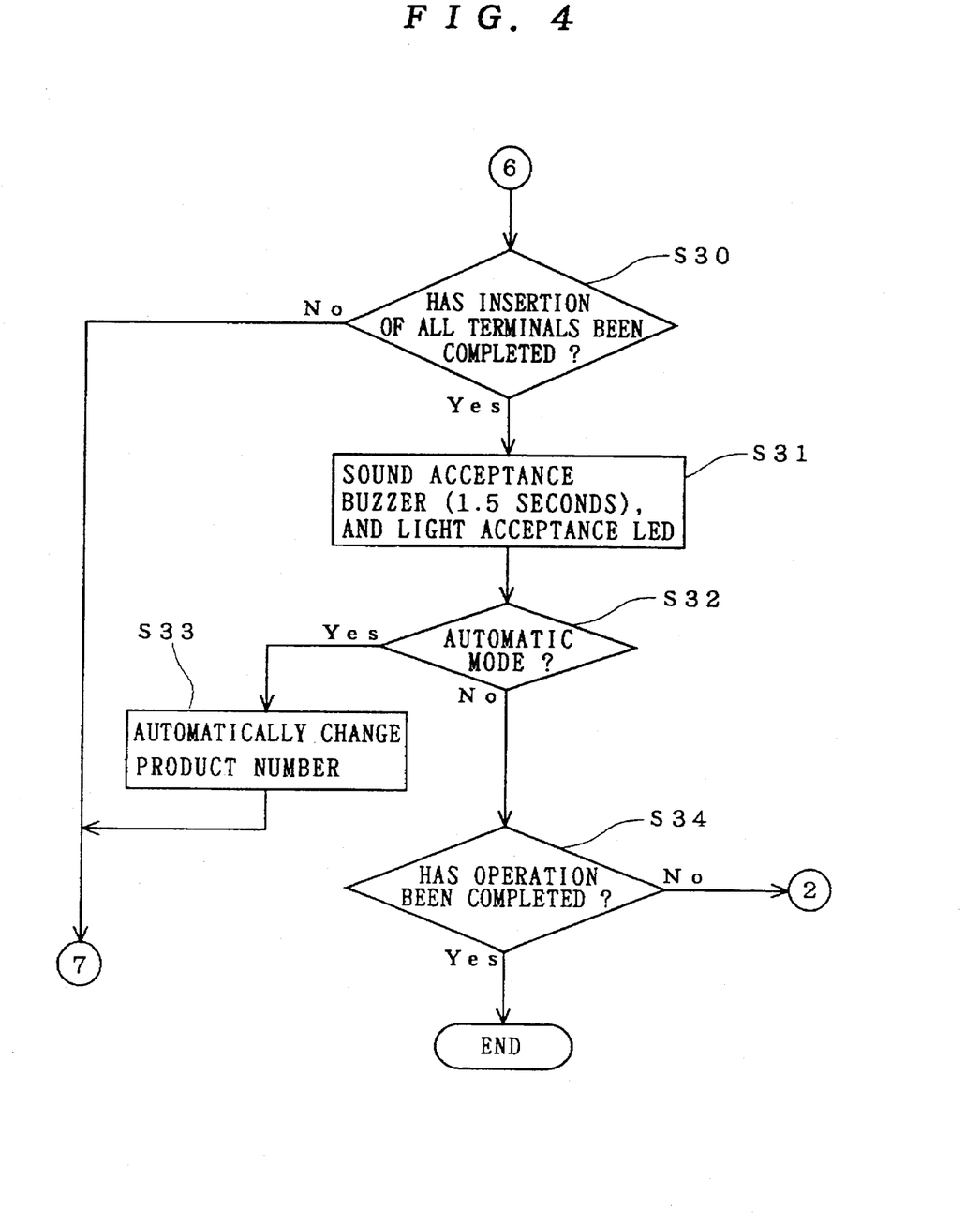

With reference to FIG. 4, whether or not the insertion of all terminals has been completed is determined (process step S30). If the result of determination in the process step S30 is NO, the flow returns to the process step S24. If the result of determination in the process step S30 is YES, the acceptance buzzer 43 is driven to sound for about 1.5 seconds which is longer than does in the process step S29, and the acceptance LED 19 lights up, indicating the correct insertion of all terminals and the provision of the acceptable connector (process step S31). Then, whether or not the current mode is the automatic mode is determined (process step S32). If the result of determination in the process step S32 is YES, the product number is automatically changed to the product number of the cable having the terminal to be inserted next (process step S33), and the flow returns to the process step S25. If the result of determination in the process step S32 is NO, whether or not the terminal insertion and inspection have been completed is determined (process step S34). If the result of determination in the process step S34 is NO, the flow returns to the process step S23. If the result of determination in the process step S34 is YES, the operation is terminated.

It should be noted that depressing the proceed switch 17 returns the apparatus to its initial state.

The cable is removed from the cable receiving portion 1 in accordance with the indication of the indicator LED 2 caused to blink by the first driving portion 23, and the light from the illuminative LED 28 caused to light up by the second driving portion 35 is introduced through the light emitting optical fibers 29 and detecting optical fibers 14 to the receiving hole of the connector to directly illuminate the interior of the select receiving hole which is to receive the terminal. This facilitates the recognition of the select receiving hole which is to receive the terminal at the end of the removed cable, eliminating the conventional need for the operator to check the receiving holes of the connector against the indicated position.

As the terminal is inserted into the indicated select receiving hole, the light reflected from the inserted terminal is directed through the detecting optical fiber 14 and light receiving optical fiber 31 onto the light receiving portion 30. The correct insertion of the terminal is detected in response to the light reception signal from the light receiving portion 30. The terminal may be inspected for proper insertion concurrently with the insertion of the terminal. This allows further improvement in operating efficiency.

The light emitting optical fibers 29 and the light receiving optical fibers 31 are coupled to each other by the photocouplers 32, respectively. The ends of the detecting optical fibers 14 are drawn out of the respective photocouplers 32 and inserted into the respective receiving holes of the connector. This causes only one detecting optical fiber 14 to be inserted into each of the receiving holes of the connector to prevent larger space for fiber insertion. Therefore, the apparatus of the present invention may be applied to a connector having small receiving holes, prevents a malfunction caused by the wall surfaces of the connector, and facilitates the detection of the vertically inserted terminals.

Additionally, the acceptance LED 19 and acceptance buzzer 43 are used to indicate that the connector is acceptable, facilitating the determination as to whether the connector is acceptable or defective.

The removal indicating light emitting means and the light emitting portions are not limited to the LEDs. The light receiving portions are not particularly limited to the photo ICs but may be phototransistors and photodiodes.

While the invention has been described in detail, the foregoing description is in all aspects illustrative and not restrictive. It is understood that numerous other modifications and variations can be devised without departing from the scope of the invention.

We claim:

1. A cable arrangement indicating and inspecting apparatus for a connector, said apparatus for indicating, among all receiving holes of a connector which are predetermined in number, at least one select receiving hole into which a terminal mounted at an end of a cable is to be inserted and for inspecting the terminal for proper insertion in said at least one select receiving hole, said apparatus comprising:

cable receiving portions corresponding respectively to all of said receiving holes of said connector for receiving cables having different product numbers;

a product number setting portion operated to input the product numbers of the cables received in required ones of said cable receiving portions;

a storage portion operated by said product number setting portion for previously storing the inputted product numbers therein;

removal indicating light emitting means provided adjacent said cable receiving portions, respectively;

light emitting portions corresponding respectively to all of said receiving holes of said connector;

light emitting optical fibers having end surfaces opposed respectively to said light emitting portions for introducing light from said light emitting portions into said receiving holes to illuminate and indicate said at least one select receiving hole;

light receiving optical fibers corresponding respectively to said light emitting optical fibers for receiving light reflected from the terminal inserted in said at least one select receiving hole indicated by illumination through said light emitting optical fibers;

light receiving portions opposed respectively to end surfaces of said light receiving optical fibers for receiving the reflected light through said light receiving optical fibers to output a light reception signal;

a first driving portion for sequentially blinking said removal indicating light emitting means adjacent said cable receiving portions receiving the cables having the product numbers stored in said storage portion when the terminal at the end of the cable is inserted;

a second driving portion for sequentially lighting some of said light emitting portions which are associated with the product numbers stored in said storage portion when the terminal at the cable end is inserted; and a judging portion for comparing the product number of the cable associated with the blinking removal indicating light emitting means in response to said light reception signal with the product numbers of the cables corresponding to said light emitting portions opposed to said light emitting optical fibers, said judging portion determining proper insertion of the terminal in said at least one select receiving hole when the compared product numbers match.

2. The cable arrangement indicating and inspecting apparatus in accordance with claim 1, further comprising:

photocouplers for coupling said light emitting optical fibers and said light receiving optical fibers, respectively; and detecting optical fibers drawn respectively from said photocouplers and having ends inserted into said receiving holes of said connector, respectively, said detecting optical fibers introducing light from said light emitting portions into said receiving holes and receiving the reflected light from the terminals in said receiving holes to transmit the reflected light to said light receiving optical fibers.

3. The cable arrangement indicating and inspecting apparatus in accordance with claim 1, further comprising:

an acceptance indicating portion for indicating that said connector is acceptable when said judging portion determines that the terminal is inserted in said at least one select receiving hole of said connector.

4. The cable arrangement indicating and inspecting apparatus in accordance with claim 2, further comprising:

an acceptance indicating portion for indicating that said connector is acceptable when said judging portion determines that the terminal is inserted in said at least one select receiving hole of said connector.

\* \* \* \* \*